United States Patent [19]

Huvers

[11] 3,735,945
[45] May 29, 1973

[54] YAW CONTROL SYSTEM FOR AN AIR VEHICLE

[75] Inventor: Marius E. Huvers, Ste Therese, Quebec, Canada

[73] Assignee: Canadian Limited, St. Laurent, District of Montreal, Quebec, Canada

[22] Filed: Mar. 29, 1971

[21] Appl. No.: 128,712

[30] Foreign Application Priority Data

Apr. 24, 1970 Canada..................................081046

[52] U.S. Cl............................................244/17.19
[51] Int. Cl...............................................B64c 27/12
[58] Field of Search.....................244/17.19, 17.21, 244/17.11, 17.23

[56] References Cited
UNITED STATES PATENTS

| | | | |
|---|---|---|---|
| 2,037,745 | 4/1936 | Vaughn | 244/17.19 |
| 2,644,533 | 7/1953 | Maillard et al. | 244/17.19 UX |
| 2,838,123 | 6/1958 | Olcott | 244/17.19 |

Primary Examiner—Milton Buchler
Assistant Examiner—Paul E. Sauberer
Attorney—Christen & Sabol

[57] ABSTRACT

An air vehicle having a pair of contrarotating rotors is provided with a yaw control system including a variable clutch operatively associated with a differential gearbox in such a manner that the energization of the clutch will produce a variation in the relative speeds of rotation and torques of two rotating elements driven by the differential gearbox and drivingly connected to a respective one of each of the two contrarotating rotors.

15 Claims, 5 Drawing Figures

Patented May 29, 1973
3,735,945
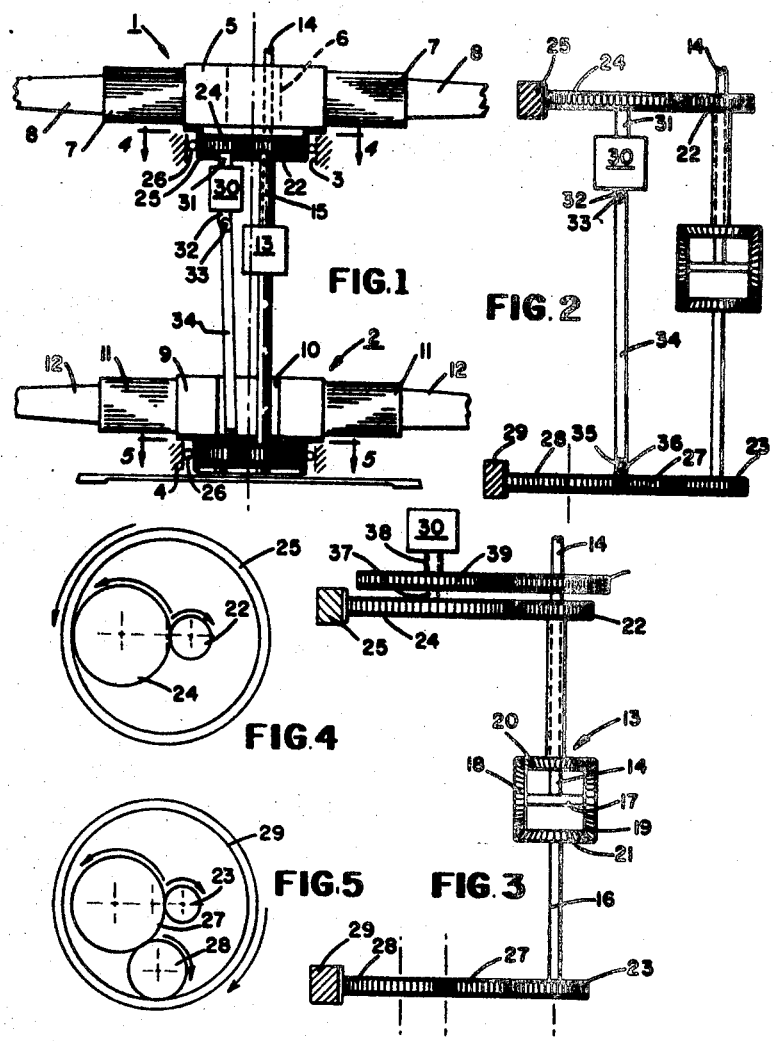

YAW CONTROL SYSTEM FOR AN AIR VEHICLE

The present invention relates to an air vehicle having coaxial contrarotating rotors and more particularly, to such an air vehicle including an improved yaw control system therein.

Air vehicles with coaxial contrarotating propellers or rotors for hovering and vertical or horizontal flights must be provided with a yaw control system to control the orientation of the air vehicle so as to select the desired direction of flight or yaw attitude and to compensate for the net torque produced on the air vehicle by the relative fluctuations of the torques on the rotors. The most commonly accepted means for controlling the yaw attitude or direction of such air vehicles uses a vertical fan or propeller mounted on a tail or horizontal extension of the air vehicle. As is well known, the helicopter generally uses such tail fan or propeller. When it is not desired or possible to design an air vehicle with a tail or horizontal extension, as provided on the helicopter, some device or assembly can be associated with the driving elements of the coaxial contrarotating rotors such as to vary the relative torques thereof.

The present invention provides an improved device or assembly associated with the driving elements in order to form a yaw control system therewith. Basically, the invention proposes a simple and effective yaw control system having a differential gearbox which is operatively interconnected to two coaxial contrarotating rotors to drive the latter and a variable clutch operatively associated with the differential gearbox such as to vary the torque of one rotor relative to the torque of the other rotor and thereby vary the net reaction torque on the air vehicle to effect yaw control thereof.

Accordingly, the present invention provides in one aspect an air vehicle having a pair of coaxially mounted contrarotating rotors and a yaw control system therefor which includes a first rotational element drivingly connected to one of said two rotors, a second rotational elemental drivingly connected to the other of said two rotors, a differential gear box having first and second outputs respectively drivingly connected to said first rotational element and to said second rotational element, input means to drive said differential gearbox, and means to controllably vary the relative amounts of torque delivered to said coaxially mounted contrarotating rotors whereby to vary the relative rotational speeds of said two contrarotating rotors such as to vary the net torque exerted by the latter on the air vehicle whereby to effect yaw control.

In the preferred form of the invention the means for controllably varying the relative amounts of torque delivered to the two coaxial rotors includes a variable clutch mechanism operatively connected between the first rotational element and either said second rotational element or said input to said differential gear box with means being provided to controllably actuate the variable clutch mechanism to vary the amount of torque transmitted therethrough thereby to change the rotational speed of the first rotational element relative to the second rotational element.

The invention will now be described, by way of example only, with reference to the two embodiments shown in the accompanying drawings, in which:

FIG. 1 is an elevation view of a first embodiment of the invention;

FIG. 2 is a schematic representation of the first embodiment of FIG. 1;

FIG. 3 is a schematic representation of a second embodiment of the invention;

FIG. 4 is a cross sectional view as seen in the direction of the arrows along line 4—4 in FIG. 1;

FIG. 5 is a cross sectional view as seen in the direction of the arrows along line 5—5 in FIG. 1.

The yaw control system of the invention is adapted to be used in association with a pair of coaxial contrarotating propellers or rotors. FIG. 1 illustrates a pair of contrarotating propellers or rotors 1 and 2 mounted coaxially one above the other for rotation relative to fixed airframe portions or elements 3 and 4 of an air vehicle. The rotor 1 comprises a hub 5 having an axial bore 6 and radially extending sleeves 7 rotatably mounted thereon. A blade 8 is attached to each sleeve 7 for rotation therewith around the axis of the sleeve. Similarly, the rotor 2 comprises a hub 9 having an axial bore 10 and radially extending sleeves 11 rotatably mounted thereon. A blade 12 is attached to each sleeve 11 for rotation therewith around the axis of the sleeve. The blades 8 and 12 are hence rotatably mounted with the sleeves 7 and 11 respectively to allow for collective and cyclic pitch control. The construction of the rotors has been described as a matter of interest only and does not form part of the invention.

The elements of the invention which are required for driving the two rotors are the same in both embodiments illustrated and are now described in details with reference to all the Figures of the drawing.

A differential gearbox 13 is provided intermediate the two rotors 1 and 2. An input drive shaft 14 is connected to the differential gearbox 13 to actuate the latter. A first output shaft 15 and a second output shaft 16 extend outwardly of the differential gearbox 13. The first output shaft 15 is hollow and arranged concentric with the input drive shaft 14. The differential gearbox 13 is well known in itself and has only schematically been shown in FIGS. 2 and 3. Essentially, the differential gearbox 13 comprises a cross shaft 17 fixed at the end of the input drive shaft 14 and extending diametrically on opposite sides thereof. A pair of idler gears 18 and 19 are rotatably mounted on the opposite ends of the cross shaft 17 at equal distances from the longitudinal axis of the input drive shaft 14. A pinion 20 is fixed at the end of the hollow output shaft 15 for rotation therewith and a pinion 21 is fixed at the end of the second output shaft 16 for rotation therewith. Each of the two pinions 20 and 21 engages both idler gears 18 and 19. As is well known in the art, the rotation of the input drive shaft 14 causes rotation of both pinions 20 and 21 in the same angular direction. A first output pinion gear 22 is mounted on the hollow output shaft 15 for rotation therewith. Similarly, a second output pinion gear 23 is mounted on the second output shaft 16 for rotation therewith. A first idler gear 24 meshes with the first output pinion gear 22 for rotation therewith and with a first ring gear 25 fixed to the hub 5 of the first rotor or propeller 1. A bearing 26 is provided intermediate the outside surface of the first ring gear 25 and the fixed portion or element 3 of the airframe. A second idler gear 27 meshes with the second output pinion gear 23 and a third idler gear 28 is positioned in meshing engagement intermediate the second idler gear 27 and a second ring gear 29. The latter is fixed to the hub 9 of the rotor 2 for rotation therewith. Another bearing 26 is provided between the second ring gear 29 and the airframe portion 4.

As aforesaid, the pinion gears 20 and 21 rotate in the same angular direction when the input shaft is normally rotated. It therefore results that both output idler gears also rotate in the same angular direction, for instance, shown as clockwise in FIGS. 4 and 5. As can be seen from the arrows in the latter Figures, the first ring gear 25 and the associated rotor 1 rotate in one angular direction, shown as counterclockwise in FIG. 4, and the second ring gear 29 and the associated rotor 2 rotate in the opposite angular direction, shown as clockwise in FIG. 5. The idler gear 28 is purposely used to effect the counter rotation of one rotor relative to the other. Obviously, the so-called first gears could be associated with the lower rotor without changing the principle of the invention.

To effectively introduce the yaw controlling element, into the yaw control system, the speed ratio between the first idler gear 24 and the first output pinion gear 22 is selected different from the speed ratio between the second idler gear 27 and the second output pinion gear 23. This is done by using gears of different diameters or in other words, gears having different numbers of teeth. As a matter of example only, in the case of the first embodiment represented in the FIGS. 1, 2, 4 and 5, the first output pinion gear 22 can have 18 teeth while the second output pinion gear 23 has 17 teeth. The first idler gear 24 can have 45 teeth while the second idler gear 27 has 43 teeth. The purpose of the different speed ratios is to produce a differential speed of rotation between the first idler gear 24 and the second idler gear 27.

The yaw controlling element of the invention is a variable clutch 30 having a first shaft 31 connected to the first idler gear 24 for rotation therewith and a second shaft 32 connected by a universal joint 33, a rigid link 34 and a universal joint 35 to the axle 36 carrying the second idler gear 27. The universal joints 33 and 35 are provided to form a flexible drive between the variable clutch 30 and the second idler gear 27. The flexible drive is provided since the axes of the first and second idler gears are not aligned.

The variable clutch which has been selected is a magnetic dry particle clutch sold under the registered trade mark VIBRAC by the Vibrac Corporation, Chelmsford, Massachussets. The magnetic dry particle clutch consists of a stationary field coil and rotating first and second shaft assemblies. Engagement or clutching is accomplished electrically without axial or radial movement of any of the mechanical parts. Prior to engagement, a higher-inertia rotor shaft assembly rotates while a lower-inertia disc shaft assembly is either stationary, or rotating differently as in the present application. When a controlling input current is passed through the stationary field coil, the lower-inertia disc shaft is bonded to the higher-inertia rotor shaft by chains of magnetic particles formed along the lines of magnetic flux passing through the clutching space which is filled with extremely fine magnetic powder. Particle tolerance and transmitted torque vary directly with the strength of the impressed field. Although the above mentioned variable clutch has been selected, other variable clutches could be used probably as well and the applicant does not wish to be limited to any particular type of clutch. For instance, a mechanical or electro-mechanical clutch could be used instead of a dry magnetic particle clutch.

It has been explained earlier that speed ratios are selected to cause a speed differential between the first idler gear 24 and the second idler gear 27 and it results that a torque differential is also created between the two ring gears and rotors. In the first embodiment, the variable clutch 30 interconnects the first and second idler gears. Therefore if the clutch 30 is not energized, each of idler gears 24 and 27 rotates at its predetermined rotational speed and there is no torque transfer through the clutch. When the clutch 30 is energized, the engagement or clutching causes a transfer of torque from one side to the other of the clutch 30 the amount of torque transmitted depending on the value of the controlling current fed to the clutch. In order to provide for yaw control in both angular directions relative to the rotors axis, a biasing current is normally impressed on the clutch of sufficient magnitude to equalize the torques of the first rotor with the torque of the second rotor. In order to vary the net torque and thereby control the yaw of the air vehicle, the controlling current is selectively increased or decreased relative to the biasing level of current. The maximum net torque on the air vehicle occurs in one angular direction when the first and the second idler gears rotate at the same speed, and in the other direction when no engagement or clutching has been produced.

The second embodiment of the invention will now be described with reference to FIG. 3. The yaw controlling element or clutch 30 has a first shaft 37 axially connected to the first idler gear 24 to rotate therewith and a second shaft 38, axially connected to a pinion gear 39 for rotation therewith. The second shaft 38 is hollow and concentric with the first shaft 37. A pinion drive gear 40 is mounted on the input shaft 14 for rotation therewith.

It must be noted that the equalization of torque is done in the first embodiment by inducing a biasing current on the clutch and thereby transferring torque from one idler gear to another. In the second embodiment, there is no transfer of torque from one idler wheel to another. Instead, torque is derived from the input shaft 14 and transmitted to the first idler gear 24 by controlled energization of the clutch 30 around a selected lever of biasing current. As for the first embodiment, the level of biasing current is the amount of controlling current required to equalize the designated-unequal torques of the two rotors such as to have no net torque produced on the air vehicle.

A third embodiment of the invention which is not illustrated in the drawing is also possible. Such third embodiment having as in FIG. 3, a clutch arrangement connected between the input shaft 14 and the first idler gear 24 and another similar clutch arrangement connected between the second idler gear and an extension of the input shaft 14 through a hollow output shaft 16.

What I claim is:

1. An air vehicle including a pair of coaxially mounted contrarotating rotors and a yaw control system for said air vehicle, said yaw control system comprising a first rotational element drivingly connected to one of said two rotors, a second rotational element drivingly connected to the other of said two rotors, a differential gearbox having first and second rotational outputs projecting from opposite sides thereof respectively drivingly connected to said first rotational element and to said second rotational element, input means to drive said differential gearbox, and clutch means connected in parallel with said differential gearbox to said first and second rotational elements and constructed and arranged to transfer a variable amount of torque between the latter whereby to vary the relative amounts of torque delivered to said coaxially mounted contrarotating rotors and exerted by the latter on the air vehicle to effect the yaw control thereof.

2. The invention according to claim 1 wherein the said clutch means to vary the relative amounts of torque delivered to the coaxially mounted rotors includes a variable clutch arranged to transfer varying amounts of torque therethrough and control means for controllably actuating the variable clutch to effect said yaw control of the air vehicle.

3. The invention according to claim 2, wherein said variable clutch is a magnetic clutch including a field coil therein and wherein said control means comprises means for passing controlled amounts of electric current through said field coil to effect controlled variation of the torque transmitted through the variable clutch.

4. An air vehicle having a yaw control system as defined in claim 1, wherein said first rotational element is a first idler gear in meshing engagement with a first ring gear fixed to said one rotor, said second rotational element is a second idler gear, a second ring gear is fixed to said other rotor and a third idler gear is positioned in meshing engagement with said second idler gear and said second ring gear to reverse the direction of rotation of said other rotor relative to said second idler gear.

5. An air vehicle including a yaw control system as defined in claim 4, wherein said first idler gear and said second idler gear are positioned in spaced parallel planes and said differential is drivingly connected to said first and second idler gears such as to drive the latter in the same angular direction as seen from one side of said spaced parallel planes.

6. An air vehicle including a yaw control system as defined in claim 5, wherein said differential has a first output shaft and a second output shaft, a first pinion gear is fixedly mounted on said first output shaft in meshing engagement with said first idler gear, and a second pinion gear is fixedly mounted on said second output shaft, in meshing engagement with said second idler gear.

7. An air vehicle including a yaw control system as defined in claim 6, wherein said differential is located intermediate said spaced parallel planes and said first pinion gear and said second pinion gear are respectively located in the planes of said first and second idler gears.

8. The invention as defined in claim 2, wherein said variable clutch includes a first and a second shafts secured to said first and second rotational elements respectively for rotation therewith.

9. An air vehicle including a yaw control system as defined in claim 8, wherein said first rotational element is fixedly mounted on said first shaft for rotation therewith and said second rotational element is fixedly mounted on said second shaft for rotation therewith.

10. An air vehicle including a yaw control system as defined in claim 9, wherein said first and second shafts are substantially aligned on opposite sides of said variable clutch mechanism whereby said first and second rotational elements are mounted in spaced apart relationship on opposite sides of said variable clutch mechanism.

11. An air vehicle including a yaw control system as defined in claim 8, wherein said first rotational element is fixedly mounted on said first shaft for rotation therewith, a pinion gear is fixedly mounted on said input means for rotation therewith, an input gear is fixedly mounted on said second shaft for rotation therewith, said pinion gear meshing with said input gear to rotate said second shaft.

12. The invention as defined in claim 2, wherein said variable clutch includes a first and a second shafts secured to said first rotational element and connected to said input respectively for rotation therewith and arranged to transfer controlled amounts of torque between said first rotational element and said input to said differential gearbox.

13. The invention according to claim 2, wherein said first and second rotational elements and said first and second rotational outputs are constructed and arranged to produce a different speed of rotation of said first rotational element relative to said second rotational element.

14. In an air vehicle provided with a pair of coaxially mounted and axially spaced apart contrarotating rotors, a yaw control system comprising a first ring gear fixedly attached to one rotor concentric thereto, a second ring gear fixedly attached to the other rotor concentric thereto, a differential positioned intermediate said ring gears and having a first output shaft and a second output shaft projecting from opposite sides thereof and a rotational input element, a first pinion gear fixed to said first output shaft for rotation therewith, a second pinion gear fixed to said second output shaft for rotation therewith, a first idler gear mounted in meshing engagement with said first pinion gear and said first ring gear, a second and a third idler gears mounted in meshing engagement with each other and with said second pinion gear and said second ring gear respectively, a variable clutch mechanism having a first rotational element operatively connected to said first idler gear for rotation therewith, and control means adapted to actuate said variable clutch mechanism to change the rotational speed of said first idler gear such as to vary the net torque produced on the air vehicle by the two contrarotating rotors.

15. An air vehicle as defined in claim 14, wherein the gear ratios between said first idler gear and said first pinion gear and between said second idler gear and said second pinion gear are selected to cause the first idler gear to rotate at a higher angular speed than the second idler gear.

* * * * *